(12) United States Patent
Buskens et al.

(10) Patent No.: US 8,245,190 B2
(45) Date of Patent: *Aug. 14, 2012

(54) FIRST AND SECOND MANAGER COMPONENTS THAT COMMUNICATE TO INITIALIZE AND/OR SHUT DOWN SOFTWARE COMPONENTS IN AN ORDERED SEQUENCE

(75) Inventors: Richard W. Buskens, Robbinsville, NJ (US); Kuo-Wei Chen, Scotch Plains, NJ (US)

(73) Assignee: Alcatel Lucent, Paris (FR)

( * ) Notice: Subject to any disclaimer, the term of this patent is extended or adjusted under 35 U.S.C. 154(b) by 2116 days.

This patent is subject to a terminal disclaimer.

(21) Appl. No.: 10/867,946

(22) Filed: Jun. 14, 2004

(65) Prior Publication Data

US 2005/0278724 A1  Dec. 15, 2005

(51) Int. Cl.
*G06F 9/44* (2006.01)
*G06F 15/16* (2006.01)
*G06F 9/46* (2006.01)

(52) U.S. Cl. .......... 717/120; 709/229; 718/106

(58) Field of Classification Search .......... 717/120
See application file for complete search history.

(56) References Cited

U.S. PATENT DOCUMENTS

| | | | | |
|---|---|---|---|---|
| 5,713,027 A * | 1/1998 | Soejima et al. | .......... | 713/300 |
| 5,878,056 A * | 3/1999 | Black et al. | .......... | 714/748 |
| 5,951,694 A * | 9/1999 | Choquier et al. | .......... | 714/15 |
| 6,757,362 B1 * | 6/2004 | Cooper et al. | .......... | 379/88.01 |
| 6,883,170 B1 * | 4/2005 | Garcia | .......... | 718/1 |
| 7,181,526 B1 * | 2/2007 | Bell et al. | .......... | 709/231 |
| 7,225,427 B2 * | 5/2007 | Qureshi et al. | .......... | 717/120 |
| 7,302,609 B2 * | 11/2007 | Matena et al. | .......... | 714/15 |
| 2002/0087734 A1 * | 7/2002 | Marshall et al. | .......... | 709/310 |
| 2002/0184610 A1 * | 12/2002 | Chong et al. | .......... | 717/109 |

OTHER PUBLICATIONS

Lucent Technologies Inc., "Statement Disclosing Information About Development and Use of Technology", 2002 to 2004, 3 pgs., Murray Hill, NJ, USA.

* cited by examiner

*Primary Examiner* — James D Rutten
(74) *Attorney, Agent, or Firm* — Carmen Patti Law Group, LLC

(57) ABSTRACT

An apparatus in one example comprises: a first manager component responsible for one or more first software components within one or more first executables of a distributed software application; and a second manager component responsible for one or more second software components within one or more second executables of the distributed software application. The first and second manager components communicate to initialize and/or shut down the one or more first software components and the one or more second software components in an ordered sequence based on one or more dependency relationships among two or more of: the one or more first software components; and/or the one or more second software components.

26 Claims, 3 Drawing Sheets

FIRST AND SECOND MANAGER COMPONENTS THAT COMMUNICATE TO INITIALIZE AND/OR SHUT DOWN SOFTWARE COMPONENTS IN AN ORDERED SEQUENCE

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties.

"INSTRUCTING MANAGEMENT SUPPORT SOFTWARE OF A FIRST SOFTWARE COMPONENT TO SET UP A COMMUNICATION CHANNEL BETWEEN THE FIRST SOFTWARE COMPONENT AND A SECOND SOFTWARE COMPONENT," by Buskens, et al., co-filed herewith;

"SELECTING A PROCESSOR TO RUN AN EXECUTABLE OF A DISTRIBUTED SOFTWARE APPLICATION UPON STARTUP OF THE DISTRIBUTED SOFTWARE APPLICATION," by Buskens, et al., co-filed herewith;

"SOFTWARE COMPONENT INITIALIZATION IN AN ORDERED SEQUENCE," by Buskens, et al., co-filed herewith;

"SHUTTING DOWN A PLURALITY OF SOFTWARE COMPONENTS IN AN ORDERED SEQUENCE," by Buskens, et al., co-filed herewith;

"DISTRIBUTED SOFTWARE APPLICATION SOFTWARE COMPONENT RECOVERY IN AN ORDERED SEQUENCE," by Buskens, et al., co-filed herewith;

"MANAGER COMPONENT FOR CHECKPOINT PROCEDURES," by Buskens, et al., co-filed herewith;

"MANAGER COMPONENT THAT CAUSES FIRST SOFTWARE COMPONENT TO OBTAIN INFORMATION FROM SECOND SOFTWARE COMPONENT," by Buskens, et al., co-filed herewith;

"MANAGER COMPONENT RESOURCE ADDITION AND/OR RESOURCE REMOVAL ON BEHALF OF DISTRIBUTED SOFTWARE APPLICATION," by Gong, et al., co-filed herewith;

"SUBSTITUTE MANAGER COMPONENT THAT OBTAINS STATE INFORMATION OF ONE OR MORE SOFTWARE COMPONENTS UPON FAILURE OF A FIRST MANAGER COMPONENT," by Buskens, et al., co-filed herewith.

TECHNICAL FIELD

The invention relates generally to distributed software applications and more particularly to management of distributed software applications.

BACKGROUND

In known distributed software applications, software components are distributed among a plurality of executables (i.e., software capsules or software entities). Each of the executables contains one or more software components that perform some portion of the functionality of the distributed software application. The executables and software components of the distributed software application may all run on a single processor or may be divided up and run across a plurality of processors.

Upon startup of the distributed software application, each of the executables and software components are started. The distributed software application may have dependency relationships between the executables and/or software components of the distributed software application. As one shortcoming, without a proper startup sequence, the distributed software application may fail to completely achieve an active state of operation.

During operation of the distributed software application, state information is created, resources are allocated, and/or databases are updated. If the distributed software application shuts down without a preplanned shutdown sequence, then the distributed software application may be left in an inconsistent state. As one shortcoming, without a proper shutdown sequence, the distributed software application may not properly maintain the state information, release the allocated resources, and/or update the databases.

To handle dependency relationships between the executables and software components of the distributed software application, software developers need to write special software in each of the software components to handle startup and/or shutdown of the distributed software application. As one shortcoming, the software developers must write extra software for each software component to control the startup and/or shutdown. The extra software may need to be customized for a specific software application or system. Creating software for each software component to control startup and/or shutdown increases the amount of effort required by the software developers to create the software components.

Thus a need exists to initialize a distributed software application in a manner that achieves an active state of operation for the distributed software application. A further need exists to shut down a distributed software application in a manner that maintains state information, releases resources, and/or leaves the distributed software application in a consistent state. Yet another need exists to alleviate software components of the responsibility of controlling startup and/or shutdown.

SUMMARY

One or more distributed software applications are divided up for control by a plurality of manager components. A first manager component is responsible for one or more first software components of the distributed software application. A second manager component is responsible for one or more second software components. The first and second manager components communicate to initialize and/or shutdown the software components according to dependency relationships between the software components.

In one embodiment, there is provided an apparatus comprising: a first manager component responsible for one or more first software components within one or more first executables of a distributed software application; and a second manager component responsible for one or more second software components within one or more second executables of the distributed software application. The first and second manager components communicate to initialize the one or more first software components and the one or more second software components in an ordered sequence based on one or more dependency relationships among two or more of: the one or more first software components; and/or the one or more second software components.

In another embodiment, there is provided a method for: performing, by a first manager component, one or more management operations on a first software component within a first executable of a distributed software application; performing, by a second manager component, one or more management operations on a second software component within a second executable of the distributed software application, wherein the first software component comprises a dependency relationship on the second software component; and exchanging one or more initialization progress messages between the first and second manager components to cause the second manager component to initialize the second software component before the first manager component initializes the first software component based on the dependency relationship.

In yet another embodiment, there is provided an apparatus comprising a high availability infrastructure in communication with a distributed software application that comprises a plurality of software components within a plurality of executables. The high availability infrastructure comprises a first manager component responsible for one or more first software components of the plurality of software components. The high availability infrastructure comprises a second manager component responsible for one or more second software components of the plurality of software components. The first and second manager components exchange initialization progress messages to coordinate an initialization of the one or more first software components and the one or more second software components in an ordered sequence based on one or more dependency relationships among the plurality of software components.

In still another embodiment, there is provided an apparatus comprising: a first manager component responsible for a first software component within a first executable of a distributed software application; and a second manager component responsible for a second software component within a second executable of the distributed software application. The first software component comprises a dependency relationship on the second software component. Based on the dependency relationship, the second manager component waits for an indication from the first manager component that the first software component has been shut down before the second manager component shuts down the second software component.

In still yet another embodiment, there is provided a method for: performing, by a first manager component, one or more management operations on a first software component within a first executable of a distributed software application; performing, by a second manager component, one or more management operations on a second software component within a second executable of the distributed software application, wherein the first software component comprises a dependency relationship on the second software component; and exchanging one or more shutdown progress messages between the first and second manager components to cause the first manager component to shut down the first software component before the second manager component shuts down the second software component based on the dependency relationship.

In another embodiment, there is provided an apparatus comprising a high availability infrastructure in communication with a distributed software application that comprises a plurality of software components within a plurality of executables. The high availability infrastructure comprises a first manager component responsible for one or more first software components of the plurality of software components. The high availability infrastructure comprises a second manager component responsible for one or more second software components of the plurality of software components. The first and second manager components exchange shutdown progress messages to coordinate a shutdown of the one or more first software components and the one or more second software components in an ordered sequence based on one or more dependency relationships among the plurality of software components.

DESCRIPTION OF THE DRAWINGS

Features of exemplary implementations of the invention will become apparent from the description, the claims, and the accompanying drawings in which:

DETAILED DESCRIPTION

Figure 1:
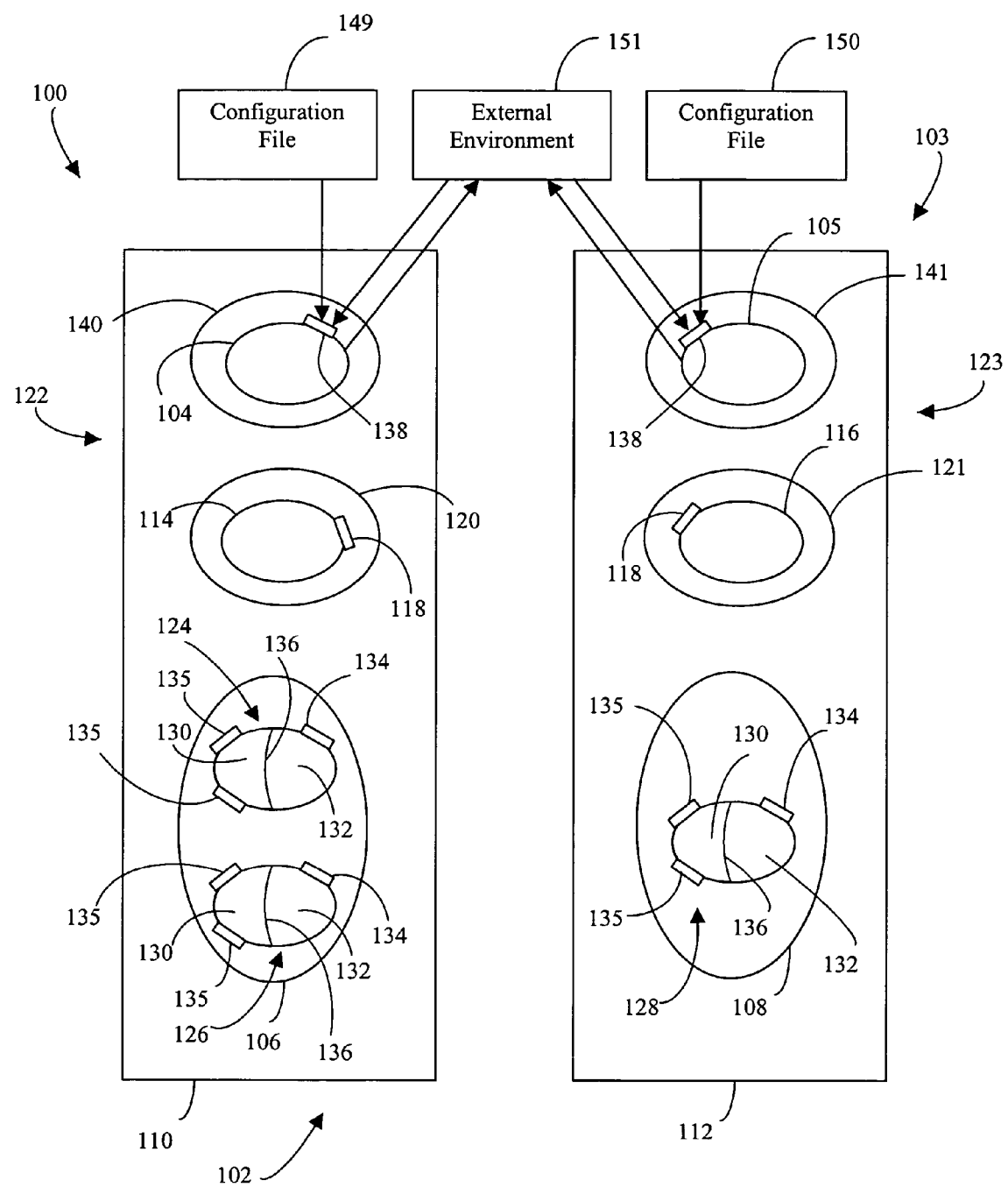
FIG. 1 is a representation of an exemplary implementation of an apparatus that comprises a distributed software application and a management infrastructure.

Turning to FIG. 1, an apparatus 100 in one example comprises a distributed software application 102 and a management infrastructure 103. The management infrastructure 103 performs one or more management operations on the distributed software application 102. The management infrastructure 103 comprises a plurality of manager components 104 and 105. For example, the manager components 104 and 105 may be responsible for one or more of starting, stopping, initializing, and monitoring the distributed software application 102, detecting failures of the distributed software application 102, recovering the distributed software application 102, propagating state changes about distributed software application 102, and the like.

The distributed software application 102 may represent a single software application or a plurality of software applications. For example, the distributed software application 102 may comprise a first functionality (i.e., a first software application) and a second functionality (i.e., a second software application). The manager component 104 may control initialization and/or shutdown of the first functionality and the manager component 105 may control initialization and/or shutdown of the second functionality.

The distributed software application 102 represents a software application divided among a plurality of executables (i.e., software capsules or software entities). For example, the distributed software application 102 comprises a plurality of executables 106 and 108. The distributed software application 102 may provide any functionality for a computer system. The distributed software application 102 in one example comprises a call processing software application. For example, the distributed software application 102 sets up and/or tears down telecommunication sessions in a telecommunication network.

The distributed software application 102 may run on a single central processing unit ("CPU") or may be divided between multiple CPUs. For example, the executable 106 may run on processor 110 and the executable 108 may run on processor 112. The processor 110 comprises an executable manager 114 and the processor 112 comprises an executable manager 116. The executable managers 114 and 116 in one example are part of the management infrastructure 103.

The executable managers 114 and 116 monitor executables of the distributed software application 102 that run on the processors 110 and 112, such as the executables 106 and 108. For example, the executable managers 114 and 116 monitor communication channels and/or diagnostics on behalf of the executables 106 and 108. Should one or more of the executables 106 and 108 fail, the respective one of the executable managers 114 and 116 informs the respective one of the manager components 104 and 105 of the failure. Multiple executable managers may report to a same manager component. For example, the manager component 104 may control a part of the distributed software application 102 that executes on multiple processors 110 and 112. Each of the executable managers 114 and 116 of the multiple processors 110 and 112 may send notifications to the manager component 104.

Each of the executable managers 114 and 116 comprise a communication interface 118 for communication with one of the manager components 104 and 105. The executable managers 114 and 116 receive instruction from the manager components 104 and 105. For example, the executable managers 114 and 116 may receive instructions at the communication interface 118 from the manager components 104 and 105. The executable manager 114 is encapsulated in an executable 120 running on the processor 110 and the executable manager 116 is encapsulated in an executable 121 running on the processor 112.

The distributed software application 102 in one example is divided into a plurality of domains. Each domain comprises a manager component. For example, the manager component 104 is responsible for the portion of the distributed software application 102 within domain 122 and the manager component 105 is responsible for the portion of the distributed software application 102 within domain 123. The domain 122 in one example comprises the manager component 104, the executable 106, the processor 110, and the executable manager 114. The domain 123 in one example comprises the manager component 105, the executable 108, the processor 112, and the executable manager 116. Each of the domains 122 and 123 may also comprise additional executables (e.g., analogous to the executables 106 and 108) of the distributed software application 102 and additional processors (e.g., analogous to the processors 110 and 112).

In one embodiment, the domains 122 and 123 represent a separation of a single functionality. For example, the distributed software application 102 may comprise a call processing functionality. The domain 122 comprises one or more first portions of the call processing functionality and the domain 123 comprises one or more second portions of the call processing functionality. For example, the executable 106 performs a first portion of the call processing functionality and the executable 108 performs a second portion of the call processing functionality.

In another embodiment, the domains 122 and 123 represent a separation between different but cooperating functionalities. For example, the distributed software application 102 may comprise call processing functionality together with base station functionality. The domain 122 may comprise the call processing functionality and the domain 123 may comprise the base station functionality. For example, the executable 106 performs the call processing functionality and the executable 108 performs the base station functionality.

The executables 106 and 108 comprise one or more software components 124, 126 and 128. For example, the executable 106 encapsulates the software components 124 and 126 and the executable 108 encapsulates the software component 128. Within each of the executables 106 and 108 may be tens, hundreds, or even thousands of other software components (e.g., analogous to the software components 124, 126 and 128).

The software components 124, 126 and 128 represent software sub-entities of the executables 106 and 108. For example, the software components 124, 126 and 128 represent logical blocks of software of the executables 106 and 108. The software components 124 and 126 in one example are developed independently and encapsulated together within the executable 106. The software components 124, 126 and 128 each perform some portion of the overall functionality of the distributed software application 102. The software components 124, 126 and 128 work together to make the distributed software application 102 achieve the desired operation.

Each of the software components 124, 126 and 128 comprise application software 130, management support software 132, a management support software communication interface 134, and one or more application software communication interfaces 135. The software components 124, 126 and 128 employ the management support software communication interfaces 134 to receive communications from the manager component 104. The software components 124, 126 and 128 employ the application software communication interfaces 135 to receive communications from other software components of the software components 124, 126 and 128. An application programming interface ("API") 136 communicatively couples the application software 130 with the management support software 132 in each of the software components 124, 126 and 128. The application software 130 and the management support software 132 can exchange information through the application programming interface 136.

The application software 130 is the portion of the software components 124, 126 and 128 that performs some portion of the overall functionality of the distributed software application 102. The management support software 132 is the portion of the software components 124, 126 and 128 that cooperates with the manager components 104 and 105 to perform management operations on the software components 124, 126 and 128. The application software 130 is part of the distributed software application 102 and the management support software 132 is part of the management infrastructure 103.

An application developer creates the application software 130 of the software components 124, 126 and 128 to achieve the designated functionality of the software components 124, 126 and 128. For example, the application developer creates the application software 130 of the software components 124, 126 and 128 to achieve the overall functionality of the distributed software application 102.

To alleviate the application developers from being required to write software into each of the software components 124, 126 and 128 for the management operations, a code generator in one example automatically generates the management support software 132. The manager components 104 and 105, the executable managers 114 and 116, and the management support software 132 cooperate to perform the management operations for the software components 124, 126 and 128.

The manager components 104 and 105 employ information from one or more configuration files 149 and 150 during initialization and/or shutdown of the distributed software application 102. The configuration files 149 and 150 are created to store connection information and/or architecture information of the distributed software application 102. The configuration files 149 and 150 in one example provide the manager components 104 and 105 with information about the set of executables 106 and 108, the number of each type of the executables 106 and 108, the mapping of the software components 124, 126 and 128 to the executables 106 and 108, the types of the software components 124, 126 and 128, and the number of each type of the software components 124, 126 and 128 in each of the executables 106 and 108. The configuration files 149 and 150 may be substantially identical or may be customized for each of the manager domains 122 and 123. The configuration files 149 and 150 comprise enough information to enable the manager components 104 and 105 to work together after discovering the existence of the other of the manager components 104 and 105.

The configuration files 149 and 150 in one example also indicate one or more dependency relationships among the software components 124, 126 and 128 and/or the executables 106 and 108. The manager components 104 and 105 employ a list of the dependency relationships to establish an ordered sequence for initialization and an ordered sequence for shutdown. The ordered sequence for shutdown in one example is substantially the reverse of the ordered sequence for initialization.

The manager component 104 initializes and/or shuts down the software components 124, 126 and 128 in the ordered sequence based on the dependency relationships among the software components 124, 126 and 128. For example, if the software component 124 of the domain 122 is dependent on the software component 128 of the domain 123, then the manager component 105 initializes the software component 128 before the manager component 104 initializes the software component 124 as part of the ordered sequence. After initialization of the software component, the manager component 105 sends a notification to the manager component 104 to alert the manager component 104 of the initialization. If the software components 124 and 128 are free from any dependency relationships, then the manager components 104 and 105 may initialize and/or shut down the software components 124 and 128 in parallel as part of the initialization or shutdown procedure.

To create the management support software 132 of the software components 124 and 126 in the domain 122, the configuration file 149 in one example is input into the code generator. To create the management support software 132 of the software component 128 in the domain 123, the configuration file 150 in one example is input into the code generator. The code generator creates code for the management support software 132. The code for the management support software 132 is compiled and linked with the application software 130 in the software components 124, 126 and 128. The management support software 132 may be different for each of the software components 124, 126 and 128, as will be appreciated by those skilled in the art.

The manager components 104 and 105 each comprise a communication interface 138 for receiving incoming communications. The communication interface 138 is employable for receiving the configuration files 149 and 150 for use with the distributed software application 102. The configuration file 149 in one example is associated with the domain 122 and the configuration file 150 is associated with the domain 123. The manager components 104 and 105 may employ other means to receive the configuration files 149 and 150, such as reading the configuration files 149 and 150 directly from a disk or file system. The communication interface 138 may also receive communications from the executable managers 114 and 116, as well as communications from the software components 124, 126 and 128.

The manager components 104 and 105 may also use the communication interfaces 138 for receipt of external system information from an external environment 151. In one example, the external environment 151 represents other components of the system that are in communication with the manager components 104 and 105. In another example, the external environment 151 represents another management infrastructure in communication with the management infrastructure 103.

The manager components 104 and 105 are encapsulated with zero or more other software components in executables 140 and 141. The executable 140 that contains the manager component 104 is run on the processor 110 or an additional processor of the domain 122. The executable 141 that contains the manager component 106 is run on the processor 112 or an additional processor of the domain 123. The manager components 104 and 105 in one example are active and the domains 122 and 123 may have one or more standby manager components (e.g., analogous to the manager components 104 and 105). If the manager component 104 fails, then one of the standby manager components of the domain 122 becomes active and gains managerial control of the domain 122.

The manager components 104 and 105 control initialization and/or shutdown of the distributed software application 102 on behalf of the distributed software application 102. One advantage to the manager components 104 and 105 controlling initialization and/or shutdown of the distributed software application 102 is that the manager components 104 and 105 alleviate application developers from being required to write software into each of the software components 124, 126 and 128 to manage initialization and/or shutdown. The manager components 104 and 105 control initialization and/or shutdown of the software components 124, 126 and 128 on behalf of the software components 124, 126 and 128. For example, the manager components 104 and 105 interface with the management support software 132 coupled with the application software 130 in the software components 124, 126 and 128 to sequence initialization and/or shutdown of the software components 124, 126 and 128. Therefore, the manager components 104 and 105 save the application developers the effort of creating software to sequence initialization and/or shutdown.

The management infrastructure 103 provides initialization and/or shutdown management functionality as a reusable asset for distributed software applications. The management infrastructure 103 in one example comprises a portion of a high availability ("HA") infrastructure. The manager components 104 and 105 comprise high availability manager components operating in a high availability infrastructure. For example, the high availability infrastructure controls initialization and/or shutdown of the software components 124, 126 and 128 in an ordered sequence for the distributed software application 102. The high availability infrastructure is able to continue processing while switching between active and standby components in the high availability infrastructure.

Figure 2:
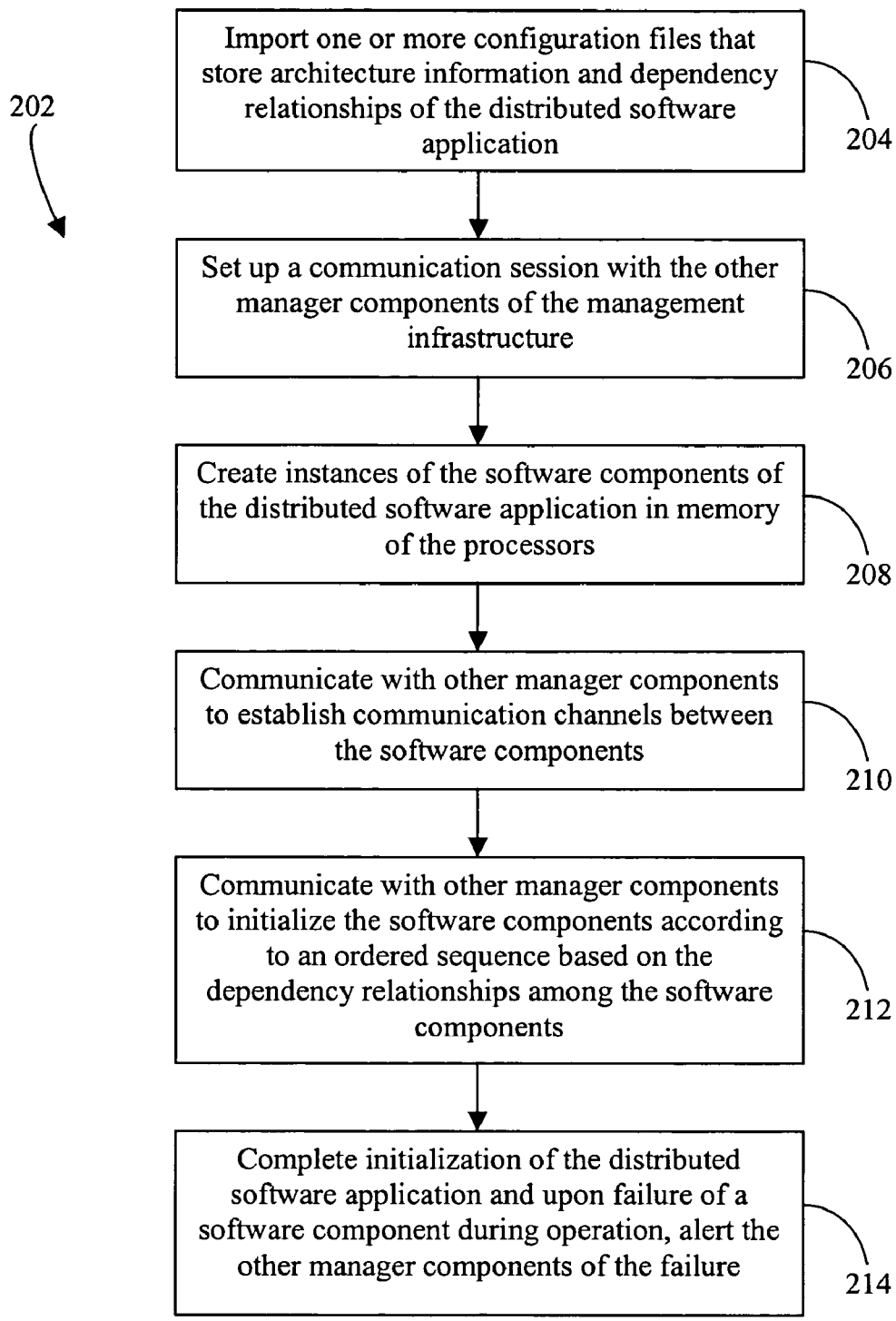
FIG. 2 is a representation of exemplary logic that serves to allow each manager component of the management infrastructure to employ an ordered sequence to initialize the distributed software application of the apparatus of FIG. 1.

Turning to FIGS. 1-2, an illustrative description of one exemplary operation of the apparatus 100 is now presented, for explanatory purposes. The manager components 104 and 105 of the management infrastructure 103 in one example comprise high availability manager components operating in a high availability infrastructure. To begin operation of the apparatus 100, the distributed software application 102 is configured for control by the manager components 104 and 105, and the manager components 104 and 105 coordinate the initialization of the distributed software application 102. Exemplary logic 202 serves to allow the manager components 104 and 105 to employ an ordered sequence to initialize the distributed software application 102. The logic 202 employs one or more steps, for example, STEPS 204, 206, 208, 210, 212 and 214. The manager components 104 and 105 perform the STEPS 204, 206, 208, 210, 212 and 214 of FIG. 2.

At STEP 204, the manager component 104 in one example imports the configuration file 149 and the manager component 105 imports the configuration file 150 to obtain connection information of the distributed software application 102. The configuration files 149 and 150 provide information to the manager components 104 and 105 to allow the manager components 104 and 105 to control initialization of the distributed software application 102.

One or more of the manager components 104 and 105 in one example receive an indication to begin initialization of the distributed software application 102. For example, the manager component 104 receives a message from the external environment 151 to initialize the distributed software application 102. At STEP 206, to begin initialization of the distributed software application 102, the manager components 104 and 105 set up a communication session for exchange of connection information and initialization progress messages. For example, the manager component 104 receives an indication of a need for communication with the manager component 105. The configuration file 149 or the external environment 151 in one example indicates to the manager component 104 the need for a communication session with the manager component 105.

To initiate a setup of the communication session, the manager component 104 sends a setup message to the manager component 105. The manager component 104 creates an identifier of the communication session and passes the identifier to the manager component 105 in the setup message. To agree to join the communication session, the manager component 105 sends a confirmation message to the manager component 104. The manager component 104 sends an acknowledgement message to the manager component 105 in response to the confirmation message to complete the transition from the proposed communication session to an active communication session.

The manager components 104 and 105 employ the communication session to acquire information from the other one of the domains 122 and 123. For example, the manager component 104 may request connection information of software component 128 from the manager component 105. The manager components 104 and 105 also employ the communication session to coordinate initialization of the distributed software application 102 across the domains 122 and 123. Once the communication session is setup, the manager component 104 and 105 exchange event notifications as part of the initialization of the distributed software application 102. The manager component 104 is responsible for coordinating any initialization activity within the domain 122 and the manager component 105 is responsible for coordinating any initialization activity within the domain 123. The manager components 104 and 105 communicate to coordinate any initialization activity that crosses between the domains 122 and 123.

The manager components 104 and 105 in one example build timeouts into the initialization progress messages. Therefore, if the manager component 104 fails to receive a response to an initialization progress message from the manager component 105 within a predefined time limit, then the manager component 104 sends another initialization progress message to the manager component 105. If the manager component 104 is again unable to get a response from the manager component 105, then the manager component 104 may determine that the manager component 105 is unavailable. The manager component 104 may then undo one or more portions of the initialization of the distributed software application 102 to get back to a known state of last successful communication with the manager component 105. For example, the manager component 104 may have set up a communication channel between the software components 124 and 128. After setup of the communication channel, if the manager component 104 is unable to get a confirmation response from the manager component 105, then the manager component 104 may tear down the communication channel and retry to create the communication channel again once communication is reestablished with the manager component 105.

To initialize the distributed software application 102, the manager components 104 and 105 initialize each of the software components 124, 126 and 128 and each of the executables 106 and 108. Once the manager components 104 and 105 have received and/or obtained the configuration files 149 and 150, the manager components 104 and 105 determine which processors are available for the distributed software application 102. For example, the manager component 104 may obtain a list of processors from the configuration file 149 and the manager component 105 obtains a list of processors from the configuration file 150. Once the manager components 104 and 105 obtain the list of processors, the manager components 104 and 105 assign the executables 106 and 108 of the distributed software application 102 to the available processors. For example, the manager component 104 assigns the executable 106 to the processor 110 and the manager component 105 assigns the executable 108 to the processor 112. The manager components 104 and 105 then start the executables 106 and 108 on the processors 110 and 112 through employment of the executable managers 114 and 116. The manager component 104 sends a message to the executable manager 114 to start the executable 106 and the manager component 105 sends a message to the executable manager 116 to start the executable 108. The messages comprise one or more parameters for execution of the executables 106 and 108.

The manager components 104 and 105 employ the configuration files 149 and 150 to initialize the distributed software application 102. The manager components 104 and 105 in one example obtain the list of dependency relationships from the configuration files 149 and 150. Exemplary conditions for a dependency relationship comprise shared state information and communication channels between software components. In one example, before a communication channel between the software component 124 and the software component 128 can be established, both the software component 124 and the software component 128 must be created. In another example, before a shared value for the software component 126 can be retrieved from the software component 124, the software component 124 must have the shared value set, as will be appreciated by those skilled in the art.

The list of dependency relationships in one example indicates to the manager components 104 and 105 that the software component 124 comprises a dependency relationship on the software component 128 and the software component 126 is free from any dependency relationship. Therefore, the manager components 104 and 105 must initialize the software component 128 before initializing the software component 124. The manager component 104 may initialize the software component 126 independently of the software components 124 and 128. The manager components 104 and 105 exchange initialization progress messages to alert the other one of the manager components 104 and 105 of the current initialization state of the distributed software application 102. For example, the manager component 104 waits for an indication from the manager component 105 that the software component 128 has been initialized before the manager component 104 initializes the software component 124.

Initialization of the software components 124, 126 and 128 within the executables 106 and 108 in one example comprises creating instances of the software components 124, 126 and 128 in memory of the processors 110 and 112, establishing communication channels between the software components 124, 126 and 128, and setting the initialization values of the software components 124, 126 and 128.

At STEP 208, the manager components 104 and 105 create instances of the software components 124, 126 and 128. The manager components 104 and 105 in one example create instances of the software components 124, 126 and 128 in parallel. At STEP 210, once the software components 124, 126 and 128 have been created, the manager components 104 and 105 may create communication channels between the software components 124, 126 and 128. The manager component 104 in one example receives an indication of a need for a communication channel between the software component 124 and the software component 128. Before the manager component 104 may set up the communication channel, the manager component 104 requires connection information of the software component 128. The manager component 104 sends a message to the manager component 105 to request the connection information of the software component 128.

The manager components 105 may decide at runtime which portion of the requested connection information to provide to the manager component 104 and which portion of the requested connection information 104 to restrict from the manager component 104. In one example, the manager component 105 accepts the request for connection information and employs the communication session to send the connection information to the manager component 104. In another example, the manager component 105 denies the request for the connection information. For example, the software component 128 may be classified as a restricted access software component or the software component 128 may be overloaded at the time of the information request. If the manager component 105 denies the request for connection information, the manager component 105 may choose to send connection information for an alternative software component analogous to the software component 128.

Upon receipt of the connection information of the software component 128 (or an analogous software component), the manager component 104 sends one or more portions of the connection information to the management support software 132 of the software component 124 to instruct the management support software 132 to set up a communication channel between the software component 124 and the software component 128. The manager component 104 sends a message to the management support software 132 that comprises identification and/or location information of the software component 128 to instruct the management support software 132 to set up the communication channel. For example, the manager component 104 may send the communication handle of the software component 128 to the management support software 132. The message also indicates which one of the application software communication interfaces 135 of the software component 128 is the target for the communication channel.

Once the management support software 132 has set up the communication channel, the management support software 132 employs the application programming interface 136 of the software component 124 to notify the application software 130 of the existence of the communication channel. If the management support software 132 is able to set up the communication channel, the management support software 132 sends an indication to the manager component 104 that the setup of communication channel was successful. The manager component 104 sends to the manager component 105 an indication of the successful setup of the communication channel. The manager component 105 sends an acknowledgement message to the manager component 104 to confirm receipt of the indication of the successful setup.

If the management support software 132 is not able to set up the communication channel, the management support software 132 sends an indication to the manager component 104 that the setup of communication channel failed. The manager component 104 may make another attempt to set up the communication channel. However, if the manager component 104 fails to set up the communication channel, the manager component 104 may send a failure indication to the manager component 105.

In one example, the manager component 104 knows exactly which software component from the domain 123 is needed. In another example, the manager component 104 knows which type of software component from the domain 123 is needed. For example, the manager component 104 receives an indication of a need for connection information of a software component of a specific software component type. The manager component 104 employs the communication session with the manager component 105 to request connection information of a specific software component type from the manager component 105. The manager component 105 determines which one or more of the software components of the domain 123 are of the specific software component type and are available for access by the manager component 104. The manager component 105 chooses one of the software components of the specific software component type and passes connection information of the chosen software component to the manager component 104. The manager component 104 may then use the connection information to set up a communication channel to the software component chosen by the manager component 105.

At STEP 212, once the communication channels between the software components 124, 126 and 128 have been created, the manager components 104 and 105 may request for the software components 124, 126 and 128 to initialize according to an ordered sequence based on the dependency relationships between the software components 124, 126 and 128. In one example, the software component 124 comprises a dependency relationship with the software component 128 and the software component 126. For example, the software component 124 is dependent on the software component 128 and the software component 126 is dependent on the software component 124. The manager components 104 and 105 determine the ordered sequence for initialization based on the dependency relationships. For example, the ordered sequence comprises the initialization of the software component 128, followed by the initialization of the software component 124, followed by the initialization of the software component 126.

To initialize the software component 128, the manager component 105 sends an initialization request to the software component 128. The software component 128 attempts to initialize and sends either an initialization success message or an initialization failure message to the manager component 105. Upon initialization of a software component (e.g., the software component 128) within the domain 123, the manager component 105 sends an initialization progress message to alert the manager component 104 of the initialization. The manager component 104 responds to the manager component 105 with a message that confirms receipt of the initialization progress message.

The manager component 104 may be waiting for the initialization progress message before continuing with initialization of the domain 122. For example, the software components 124 and 126 of the domain 122 depend on the software component 128 within the domain 122. Upon receipt of the initialization progress message, the manager component 104 may initialize the software component 124 of the domain 122 followed by the initialization of the software component 126. The manager components 104 and 105 exchange initialization progress messages and responses for initialization of the software components 124 and 126 analogously to the initialization of the software component 128, as described herein.

In another example, the software components 124 and 126 comprise dependency relationships on the software component 128. However, the software component 126 is free from any dependency relationship on the software component 124. Therefore, upon receipt of the indication of the initialization of the software component 128, the manager component 104 may initialize the software components 124 and 126 concurrently, for example, in parallel as part of the ordered sequence for initialization. Parallel initialization of the software components 124 and 126 promotes a reduction in time needed for initialization of the distributed software application 102, as will be appreciated by those skilled in the art. The manager components 104 and 105 in one example build timeouts into the initialization progress messages to handle delivery failure or component failure, as described herein.

At STEP 214, once the software components 124, 126 and 128 set initial values for the software components 124, 126 and 128, initialization of the software components 124, 126 and 128 in one example is complete. Upon completion of the initialization of the distributed software application 102, one or more of the manager components 104 and 105 send an initialization success message to the other one of the manager components 104 and 105. The manager component may then distribute the initialization success message to the software components 124, 126 and 128 within the respective domains 122 and 123.

After initialization of the software components 124, 126, and 128, the manager components 104 and 105 instruct the executable managers 114 and 116 to monitor the software components 124, 126, and 128. The executable managers 116 and 118 monitor the software components 124, 126, and 128 for correct operation. Upon an error and/or fault related to one or more of the software components 124, 126, and/or 128, the executable manager 114 or 116 notifies its respective manager component 104 or 105 of the error and/or fault. In one example, the software component 124 experiences a failure. The executable manager 114 detects the failure and sends a failure message to the manager component 104 to alert the manager component 104 of the failure. The manager component 104 then sends an indication of the failure to the manager component 105. Both of the manager components 104 and 105 take any appropriate action within their respective domains 122 and 123 to recover from the failure and may notify each other of the actions as they progress, as appropriate, as will be appreciated by those skilled in the art.

Upon recovery of the software component 124, the manager component 104 sends a recovery notification to the manager component 105. The manager component 105 responds with an acknowledgement to the manager component 104 to confirm receipt of the recovery notification. The manager components 104 and 105 take any appropriate action within their respective domains 122 and 123 to regain full active operation of the distributed software application 102, as will be appreciated by those skilled in the art.

Figure 3:
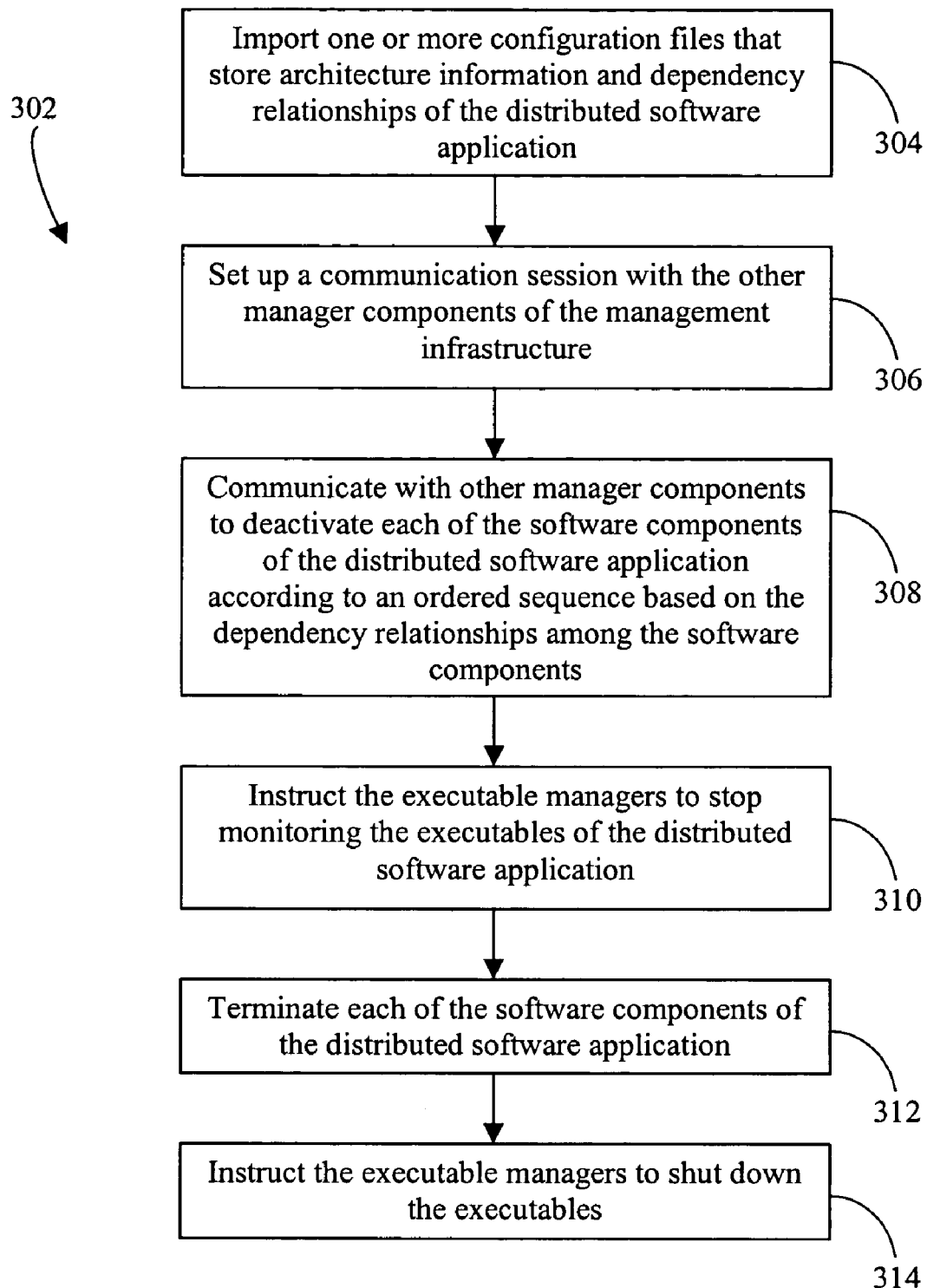
FIG. 3 is a representation of exemplary logic that serves to allow each manager component of the management infrastructure to employ an ordered sequence to shut down the distributed software application of the apparatus of FIG. 1.

Turning to FIGS. 1 and 3, an illustrative description of one exemplary operation of the apparatus 100 is now presented, for explanatory purposes. The manager components 104 and 105 of the management infrastructure 103 in one example comprise high availability manager components operating in a high availability infrastructure. Exemplary logic 302 serves to allow the manager components 104 and 105 to employ an ordered sequence to shut down the distributed software application 102. The logic 302 employs one or more steps, for example, STEPS 304, 306, 308, 310, 312 and 314. The manager components 104 and 105 perform the STEPS 304, 306, 308, 310, 312 and 314 of FIG. 3.

At STEP 304, the manager component 104 in one example imports the configuration file 149 and the manager component 105 imports the configuration file 150 to obtain connection information of the distributed software application 102. The configuration files 149 and 150 provide information to the manager components 104 and 105 to allow the manager components 104 and 105 to control shutdown of the distributed software application 102.

To shut down the distributed software application 102, the manager components 104 and 105 shut down the software components 124, 126 and 128 in an ordered sequence based on the dependency relationships among the software components 124, 126 and 128 and/or among the executables 106 and 108. Shutting down the distributed software application 102 in the ordered sequence serves to save a record of state information, release allocated resources, and properly update databases. For example, the manger components 104 and 105 save the state information into a file system to maintain a record of operation of the distributed software application 102, so the state information may be retrieved at a later time. The domains 122 and 123 may share a file system or each of the domains 122 and 123 may have separate file systems. The manger components 104 and 105 serve to shut down the executables 106 and 108 according to the ordered sequence. The manager components 104 and 105 also serve to shut down the software components 124, 126 and 128 running within the executables 106 and 108 according to the ordered sequence.

One or more of the manager components 104 and 105 in one example receive an indication to begin shutdown of the distributed software application 102. For example, the manager component 104 receives a message from the external environment 151 to shut down the distributed software application 102. At STEP 306, to begin shutdown of the distributed software application 102, the manager components 104 and 105 establish a communication session for exchange of shutdown progress messages. The manager components 104 and 105 may reuse the communication session that was set up for initialization of the distributed software application 102 or may reestablish another communication session.

The manager components 104 and 105 employ the communication session to acquire information from the other one of the domains 122 and 123. For example, the manager component 104 may request connection information of software component 128 from the manager component 105. The manager components 104 and 105 also employ the communication session to coordinate shutdown of the distributed software application 102 across the domains 122 and 123. Once the communication session is setup, the manager component 104 and 105 exchange event notifications as part of the shutdown of the distributed software application 102. The manager component 104 is responsible for coordinating any shutdown activity within the domain 122 and the manager component 105 is responsible for coordinating any shutdown activity within the domain 123. The manager components 104 and 105 communicate to coordinate any shutdown activity that crosses between the domains 122 and 123. For example, the manager components 104 and 105 exchange shutdown progress messages to coordinate the shutdown activity across the domains 122 and 123.

The manager components 104 and 105 in one example build timeouts into the shutdown progress messages. Therefore, if the manager component 104 fails to receive a response to a shutdown progress message from the manager component 105 within a predefined time limit, then the manager component 104 sends another shutdown progress message to the manager component 105. If the manager component 104 is again unable to get a response from the manager component 105, then the manager component 104 may determine that the manager component 105 is unavailable and complete the shutdown procedure assuming that the domain 123 managed by the manager component 105 is unavailable. In another example, the manager component 104 pauses the shutdown procedure until the manager component 104 is able to establish another communication session with the manager component 105, then the manager components 104 and 105 continue with the shutdown procedure.

To shut down the distributed software application 102, the manager components 104 and 105 shut down each of the software components 124, 126 and 128 and each of the executables 106 and 108. Once the manager components 104 and 105 have received and/or obtained the configuration files 149 and 150, the manager components 104 and 105 employ the list of the dependency relationships to establish an ordered sequence for shutdown. Exemplary conditions for a dependency relationship comprise shared state information and communication channels between software components.

The list of dependency relationships in one example indicates to the manager components 104 and 105 that the software component 124 comprises a dependency relationship on the software component 128 and the software component 126 is free from any dependency relationship. Therefore, the manager components 104 and 105 agree to shut down the software component 124 before shutting down the software component 128. The manager component 104 may shut down the software component 126 independently of the software components 124 and 128. The manager components 104 and 105 exchange shutdown progress messages to notify the other one of the manager components 104 and 105 of the current shutdown state of the distributed software application 102. For example, the manager component 105 waits for an indication from the manager component 104 that the software component 124 has been shut down before the manager component 105 shuts down the software component 128.

Shutdown of the software components 124, 126 and 128 within the executables 106 and 108 comprises deactivation of each of the software components 124, 126 and 128, tearing down communication channels between the software components 124, 126 and 128, followed by termination of each of the software components 124, 126 and 128.

At STEP 308, the manager components 104 and 105 cooperate to deactivate the software components 124, 126 and 128 according to the ordered sequence. In one example, the software component 124 comprises a dependency relationship with the software component 128 and the software component 126. For example, the software component 124 is dependent on the software component 128 and the software component 126 is dependent on the software component 124. The manager components 104 and 105 determine the ordered sequence based on the dependency relationships. For example, the ordered sequence comprises the deactivation of the software component 126, followed by the deactivation of the software component 124, followed by the deactivation of the software component 128.

To deactivate the software component 126, the manager component 104 sends a deactivation message to the management support software communication interface 134 of the software components 126. The deactivation message indicates to the software component 126 to wrap up any current tasks and to not take on any new tasks. The manager component 104 may also instruct the active software components of the software component 124 and the software component 128 (e.g., via the manager component 105) to not send new tasks to the software component 126. Before proceeding, the manager component 104 waits for a confirmation message from the software component 126 to confirm the deactivation of the software component 126.

Upon deactivation of the software component 126 and receipt of the confirmation message, the manager component 104 sends a shutdown progress message to notify the manager component 105 of the deactivation. The manager component 110 responds to the manager component 104 with a message that confirms receipt of the shutdown progress message. The manager component 105 may be waiting for the shutdown progress message before continuing with shutdown of the domain 123. For example, the manager component 105 is unable to deactivate the software component 128 of the domain 123 until the manager component 104 deactivates the software components 124 and 126 within the domain 122.

After deactivation of the software component 126, the manager component 104 is able to deactivate the software component 124 following the ordered sequence. The manager component 104 deactivates the software component 124 and notifies the manager component 105 of the deactivation analogously to the deactivation of the software component 126, described herein. Upon receipt of the shutdown progress message that indicates deactivation of the software component 124, the manager component 105 is able to deactivate the software component 128. The manager components 104 and 105 exchange initialization progress messages and responses for the deactivation of the software component 128 analogously to the deactivation of the software component 126, described herein. The manager components 104 and 105 in one example build timeouts into the shutdown progress messages to handle delivery failure or component failure, as described herein.

In another example, the software component 128 comprises a dependency relationship on the software components 124 and 126. However, the software component 126 is free from any dependency relationship on the software component 124. Therefore, upon receipt of the indication of the deactivation of the software component 128, the manager component 104 may deactivate the software components 124 and 126 concurrently, for example, in parallel as part of the ordered sequence. Parallel creation of the software components 124 and 126 promotes a reduction in time needed for shutdown of the distributed software application 102, as will be appreciated by those skilled in the art.

Once the manager components 104 and 105 have deactivated each of the software components 124, 126 and 128 according to the ordered sequence, the manager components 104 and 105 wait for the software components 124, 126 and 128 to complete processing of any remaining tasks. After the software components 124, 126 and 128 completely deactivate and are no longer performing tasks for the distributed software application 102, the manager components 104 and 105 may tear down the communication channels between the software components 124, 126 and 128 and then terminate each of the software components 124, 126 and 128.

At STEP 310, before terminating the executables 106 and 108 and the software components 124, 126 and 128 within the executables 106 and 108, the manager component 104 instruct the executable managers 114 and 116 to stop monitoring the executables 106 and 108. For example, the manager component 104 sends a message to the communication interface 118 of the executable manager 114 to instruct the executable manager 114 to stop monitoring the executable 106. The manager component 105 sends a message to the communication interface 118 of the executable manager 116 to instruct the executable manager 116 to stop monitoring the executable 108.

After the executable managers 114 and 116 stop monitoring the executables 106 and 108, the manager components 104 and 105 may begin terminating the software components 124, 126 and 128 according to the ordered sequence. At STEP 312, the manager components 104 and 105 send termination messages to the management support software communication interfaces 134 of the software components 124, 126 and 128. The termination messages instruct the software components 124, 126 and 128 to stop running. In one embodiment, the manager components 104 and 105 terminate the software components 124, 126 and 128 without following the ordered sequence. In another embodiment, the manager components 104 and 105 terminate the software components 124, 126 and 128 according to the ordered sequence. For example, the manager components 104 and 105 exchange shutdown progress messages and responses for termination of the software components 124, 126 and 128 analogously to the deactivation of the software components 124, 126 and 128, described herein.

At STEP 314, once the manager components 104 and 105 terminate each of the software components 124, 126 and 128, the manager components 104 and 105 instruct the executable managers 114 and 116 to shut down the executables 106 and 108. For example, the manager component 104 sends a message to the communication interface 118 of the executable manager 114 to instruct the executable manager 114 to shut down the executable 106. The manager component 105 sends a message to the communication interface 118 of the executable manager 116 to instruct the executable manager 116 to shut down the executable 108. Upon shutdown of the executables 106 and 108, the executable managers 114 and 116 each send confirmation messages to the manager components 104 and 105 to indicate a successful shutdown of the executables 106 and 108. Receipt of the confirmation messages from the executable managers 114 and 116 indicates to the manager components 104 and 105 that the distributed software application 102 is fully shutdown.

Upon completion of the shutdown of the distributed software application 102, one or more of the manager components 104 and 105 send a shutdown success message to the other one of the manager components 104 and 105. After shutdown, the manager components 104 and 105 may close the communication session or leave the communication session open for coordination of other activities between the domains 122 and 123.

The apparatus 100 in one example comprises a plurality of components such as one or more of electronic components, hardware components, and/or computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium of the manager components 104 and 105. The computer-readable signal-bearing medium for the apparatus 100 in one example comprise one or more of a magnetic, electrical, optical, biological, and atomic data storage medium. For example, the computer-readable signal-bearing medium comprises floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network. The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
    a non-transitory computer readable medium encoded with readable instructions that when executed by a first computer processor implement a first manager component that executes on the first computer processor responsible for one or more first components that execute on the first computer processor within one or more first executables; and
    a non-transitory computer readable medium encoded with readable instructions that when executed by a second computer processor implement a second manager component that executes on the second computer processor responsible for one or more second components that execute on the second computer processor within one or more second executables;
    wherein the first and second manager components communicate by exchanging one or more initialization progress messages between the first and second manager components to initialize the one or more first components and the one or more second components in an ordered sequence based on one or more dependency relationships among two or more of the one or more first components, and the one or more second components; and
    wherein the one or more first components comprise a third component, and wherein the one or more second components comprise a fourth component; and
    wherein the one or more dependency relationships comprise a dependency relationship of the third component on the fourth component; and wherein upon completion of successful initialization of the fourth component, the second manager component sends an indication of the initialization to the first manager component; and wherein based on the dependency relationship, the first manager component waits for the indication from the second manager component before the first manager component initializes the third component, and upon receipt of the indication, the first manager component initializes the third component.

2. The apparatus of claim 1, wherein the first manager component comprises a first high availability manager component operating in a high availability infrastructure, and wherein the second manager component comprises a second high availability manager component operating in the high availability infrastructure; and wherein the first and second high availability manager components are external to the one or more first components and the one or more second components.

3. The apparatus of claim 1, wherein the first manager component receives an indication of a need for communication with the second manager component; and wherein the first manager component sends a setup message to the second manager component to initiate setup of a communication session, and wherein the setup message comprises an identifier of the communication session; and wherein the second manager component sends a confirmation message to the first manager component to agree to join the communication session.

4. The apparatus of claim 3, wherein the first manager component employs the communication session with the second manager component to request connection information of the fourth component from the second manager component; and wherein the second manager component employs the communication session to pass the connection information of the fourth component to the first manager component.

5. The apparatus of claim 4, wherein the third component comprises management support software and application software; and wherein the first manager component sends one or more portions of the connection information to the management support software of the third component to instruct the management support software to set up a communication channel between the third component and the fourth component; and wherein the first manager component sends to the second manager component an indication of a successful setup of the communication channel.

6. The apparatus of claim 3, wherein the first manager component employs the communication session with the second manager component to request connection information of a specific software component type from the second manager component; and wherein the second manager component determines which one or more of the one or more second components are of the specific software component type and are available for access by the first manager component; and wherein the second manager component employs the communication session to pass the connection information of the one or more of the one or more second components to the first manager component; and wherein the first manager component employs the connection information to setup a communication channel between the third component and one of the one or more of the one or more second components of the specific software component type.

7. The apparatus of claim 1, wherein the first manager component requests connection information of one or more of the one or more second components from the second manager component; and wherein the second manager component decides at runtime which portion of the connection information to provide to the first manager component and which portion of the connection information to restrict from the first manager component.

8. The apparatus of claim 1, wherein the first manager component controls a first domain that comprises the one or more first components, and wherein the second manager controls a second domain that comprises the one or more second components; and wherein the first and second manager components exchange one or more initialization progress messages to coordinate a cross-domain initialization between the first and second domains of the one or more first components and the one or more second components according to the ordered sequence.

9. The apparatus of claim 1, wherein the first manager component sends a failure notification to the second manager component upon failure of the third component of the one or more first components; and wherein the second manager component sends an acknowledgement to the first manager component to confirm receipt of the failure notification.

10. The apparatus of claim 9, wherein the first manager component sends a recovery notification to the second manager component upon recovery of the third component; and wherein the second manager component sends an acknowledgement to the first manager component to confirm receipt of the recovery notification.

11. The apparatus of claim 1, wherein the first and second manager components exchange one or more initialization progress messages to coordinate an initialization of the one or more first components and the one or more second components according to the ordered sequence; and wherein during the initialization of the one or more first components and the one or more second components, the first manager component sends an initialization progress message of the one or more initialization progress messages to the second manager component; and wherein upon a transmission failure of the initialization progress message, the first manager component attempts to resend the initialization progress message; and wherein if the first manager component determines that the second manager component is unavailable, then the first manager component undoes one or more portions of the initialization to get back to a known state of last successful communication with the second manager component.

12. The apparatus of claim 1, further comprising a call processing software application;

wherein the first and second manager components oversee initialization of the one or more first components and the one or more second components for the call processing software application.

13. A method, comprising the steps of:

performing, by a first manager component that executes on a first computer processor, one or more management operations on a first software component within a first executable of a distributed software application;

performing, by a second manager component that executes on a second computer processor, one or more management operations on a second software component within a second executable of the distributed software application, wherein the first software component comprises a dependency relationship on the second software component;

exchanging one or more initialization progress messages between the first and second manager components to cause the second manager component to initialize the second software component before the first manager component initializes the first software component based on the dependency relationship;

sending, upon initialization of the second software component by the second manager component, an initialization progress message of the one or more initialization progress messages to indicate to the first manager component that the second software component has been initialized; and waiting for the initialization progress message from the second manager component that indicates that the second software component has been initialized before the first manager component initializes the first software component;

wherein the first manager component performs one or more management operations on a third software component within the first executable; and wherein the second manager component performs one or more management operations on a fourth software component within the second executable; and wherein the third software component comprises a dependency relationship on the fourth software component; and wherein upon completion of successful initialization of the fourth software component, the second manager component sends an indication of the initialization to the first manager component; and wherein based on the dependency relationship on the fourth software component, the first manager component waits for the indication from the second manager component before the first manager component initializes the third software component, and upon receipt of the indication, the first manager component initializes the third software component.

14. The method of claim 13, wherein the distributed software application comprises a plurality of software components, and wherein the plurality of software components comprises the first software component, the second software component, and one or more other software components; and wherein the step of exchanging the one or more initialization progress messages between the first and second manager components to cause the second manager component to initialize the second software component before the first manager component initializes the first software component based on the dependency relationship further comprises the steps of:

establishing an ordered sequence for initialization of the plurality of software components based on one or more dependency relationships among the plurality of software components; and exchanging the one or more initialization progress messages between the first and second manager components to initialize each of the plurality of software components according to the ordered sequence.

15. An apparatus, comprising:

a non-transitory computer readable medium encoded with readable instructions that when executed by a first computer processor implement a first manager component that executes on the first computer processor responsible for a first software component within a first executable of a distributed software application; and a non-transitory computer readable medium encoded with readable instructions that when executed by a second computer processor implement a second manager component that executes on the second computer processor responsible for a second software component within a second executable of the distributed software application:

wherein the first software component comprises a dependency relationship on the second software component; and wherein based on the dependency relationship, the second manager component waits for an indication from the first manager component that the first software component has been shut down before the second manager component shuts down the second software component; and wherein to begin shutdown of the first software component, the first manager component deactivates the first software component; and wherein the first manager component sends a shutdown progress message to the second manager component to notify the second manager component that the first software component has been deactivated: and wherein upon receipt of the shutdown progress message, the second manager component deactivates the second software component to begin shutdown of the second software component; and wherein after the first and second software components have been deactivated, the first and second manager components terminate the first and second software components to complete shutdown of the first and second software components; and wherein upon termination of the first software component and any other software components of the first executable, the first manager component instructs a first executable manager to terminate the first executable; and wherein upon termination of the second software component and any other software components of the second executable, the second manager component instructs a second executable manager to terminate the second executable.

16. The apparatus of claim 15, wherein the first manager component comprises a first high availability manager component operating in a high availability infrastructure, and wherein the second manager component comprises a second high availability manager component operating in the high availability infrastructure; and wherein the first and second high availability manager components are external to the first and second software components.

17. The apparatus of claim 15, wherein the first and second manager components are responsible for a plurality of software components of the distributed software application, and wherein the plurality of software components comprise the first software component, the second software component, and one or more additional software components; and wherein one or more of the first and second manager components establish an ordered sequence for shutdown of the plurality of software components based on one or more dependency relationships among the plurality of software components.

18. The apparatus of claim 17, wherein the first and second manager components exchange shutdown progress messages to coordinate a shutdown of the plurality of software components according to the ordered sequence.

19. The apparatus of claim 15, wherein based on the dependency relationship, the first and second software components agree to shut down the first software component before shutting down the second software component; and
   wherein upon receipt of an indication that the distributed software application is ready for a shutdown of the first software component, the first manager component shuts down the first software component; and
   wherein the first manager component sends a shutdown progress message to the second manager component to indicate that the first software component has been shut down; and
   wherein upon receipt of the shutdown progress message, the second software component shuts down the second software component.

20. The apparatus of claim 15, wherein prior to shutting down the first software component, the first manager component instructs a first executable manager to stop monitoring the first executable; and
   wherein prior to shutting down the second software component, the second manager component instructs a second executable manager to stop monitoring the second executable.

21. The apparatus of claim 15, wherein the shutdown progress message comprises a first shutdown progress message; and
   wherein upon termination of the first software component, the first manager component sends a second shutdown progress message to the second manager component to notify the second manager component that the first software component has been terminated; and
   wherein upon receipt of the second shutdown progress message, the second manager component terminates the second software component to complete shutdown of the first and second software components; and
   wherein based on the dependency relationship, the second manager component waits for receipt of the second shutdown progress message before terminating the second software component.

22. The apparatus of claim 15, wherein the first and second software components comprise management support software and application software; and
   wherein to deactivate the first software component, the first manager component sends a first deactivation message to the management support software of the first software component to instruct the first software component to not take on new tasks; and
   wherein to deactivate the second software component, the second manager component sends a second deactivation message to the management support software of the second software component to instruct the second software component to not take on new tasks; and
   wherein to terminate the first software component, the first manager component sends a first termination message to the management support software of the first software component to instruct the first software component to stop running; and
   wherein to terminate the second software component, the second manager component sends a second termination message to the management support software of the second software component to instruct the second software component to stop running.

23. The apparatus of claim 15, wherein the first and second manager components are responsible for a plurality of software components of the distributed software application, and wherein the plurality of software components comprises the first and second software components; and
   wherein the first and second manager components exchange one or more shutdown progress messages to coordinate a shutdown of the plurality of software components according to an ordered sequence based on one or more dependency relationships among the plurality of software components; and
   wherein during the shutdown of the plurality of software components, the first manager component sends a shutdown progress message, of the one or more shutdown progress messages, to the second manager component; and
   wherein upon a transmission failure of the shutdown progress message, the first manager component attempts to resend the shutdown progress message; and
   wherein if the first manager component determines that the second manager component is unavailable, then the first manager component pauses the shutdown until communication is reestablished with the second manager component.

24. The apparatus of claim 15, wherein the first manager component controls a first domain that comprises one or more first software components of the distributed software application, and wherein the second manager controls a second domain that comprises one or more second software components of the distributed software application; and
   wherein the first and second manager components exchange one or more shutdown progress messages to coordinate a cross-domain shutdown, between the first and second domains, of the distributed software application according to an ordered sequence based on one or more dependency relationships among the one or more first software components and the one or more second software components.

25. A method, comprising the steps of:
performing, by a non-transitory computer readable medium encoded with readable instructions that when executed by a first computer processor implement a first manager component that executes on the first computer processor responsible for a first software component within a first executable of a distributed software application,
performing, by a non-transitory computer readable medium encoded with readable instructions that when executed by a second computer processor implement a second manager component that executes on the second computer processor responsible for a second software component within a second executable of the distributed software application, wherein the first software component comprises a dependency relationship on the second software component; and
wherein based on the dependency relationship, the second manager component waits for an indication from the first manager component that the first software component has been shut down before the second manager component shuts down the second software component; and
wherein to begin shutdown of the first software component, the first manager component deactivates the first software component; and
wherein the first manager component sends a shutdown progress message to the second manager component to notify the second manager component that the first software component has been deactivated; and wherein upon receipt of the shutdown progress message, the second manager component deactivates the second software component to begin shutdown of the second software component; and wherein after the first and second software components have been deactivated, the first and second manager components terminate the first and second software components to complete shutdown of the first and second software components; and wherein upon termination of the first software component and any other software components of the first executable, the first manager component instructs a first executable manager to terminate the first executable; and wherein upon termination of the second software component and any other software components of the second executable, the second manager component instructs a second executable manager to terminate the second executable.

26. An apparatus, comprising:

a high availability infrastructure in communication with a distributed software application that comprises a plurality of software components within a plurality of executables;

wherein the high availability infrastructure comprises a non-transitory computer readable medium encoded with readable instructions that when executed by a first computer processor implements a first manager component that executes on the first computer processor responsible for a first software component within a first executable of the distributed software application, and wherein the high availability infrastructure comprises a non-transitory computer readable medium encoded with readable instructions that when executed by a second computer processor implements a second manager component that executes on the second computer processor responsible for a second software component within a second executable of the distributed software application;

wherein the first software component comprises a dependency relationship on the second software component; and wherein based on the dependency relationship, the second manager component waits for an indication from the first manager component that the first software component has been shut down before the second manager component shuts down the second software component; and wherein to begin shutdown of the first software component, the first manager component deactivates the first software component; and wherein the first manager component sends a shutdown progress message to the second manager component to notify the second manager component that the first software component has been deactivated; and wherein upon receipt of the shutdown progress message, the second manager component deactivates the second software component to begin shutdown of the second software component; and wherein after the first and second software components have been deactivated, the first and second manager components terminate the first and second software components to complete shutdown of the first and second software components; and wherein upon termination of the first software component and any other software components of the first executable, the first manager component instructs a first executable manager to terminate the first executable; and wherein upon termination of the second software component and any other software components of the second executable, the second manager component instructs a second executable manager to terminate the second executable.

* * * * *